（12） United States Patent
Murai et al.

(10) Patent No.: US 7,054,712 B2
(45) Date of Patent: May 30, 2006

(54) WIRE CONTACT/NONCONTACT BOUNDARY POSITION DETECTING APPARATUS OF WIRE CUT DISCHARGE MACHINE

(75) Inventors: Masao Murai, Yamanashi (JP); Akiyoshi Kawahara, Yamanashi (JP); Akihiro Sakurai, Yamanashi (JP); Yasuo Nakashima, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 461 days.

(21) Appl. No.: 10/463,342

(22) Filed: Jun. 18, 2003

(65) Prior Publication Data

US 2004/0030440 A1    Feb. 12, 2004

(30) Foreign Application Priority Data

Aug. 6, 2002    (JP)    ............................. 2002-228994

(51) Int. Cl.
*B23H 7/02*    (2006.01)
*G06F 19/00*    (2006.01)

(52) U.S. Cl. .................... 700/162; 700/160; 219/69.11
(58) Field of Classification Search ................ 700/159, 700/160, 162; 219/69.11, 69.12
See application file for complete search history.

(56) References Cited

U.S. PATENT DOCUMENTS

| | | | | |
|---|---|---|---|---|
| 5,003,147 A | * | 3/1991 | Kawanabe et al. | 219/69.12 |
| 5,021,622 A | * | 6/1991 | Magara et al. | 219/69.12 |
| 5,043,550 A | * | 8/1991 | Sakaue | 219/69.12 |
| 5,306,888 A | * | 4/1994 | Kaneko et al. | 219/69.12 |
| 5,315,259 A | * | 5/1994 | Jostlein | 324/690 |
| 5,563,797 A | * | 10/1996 | Koyasu | 700/162 |
| 5,744,775 A | * | 4/1998 | Yasuda et al. | 219/69.12 |
| 5,852,269 A | * | 12/1998 | Toyonaga et al. | 219/69.12 |
| 6,320,151 B1 | * | 11/2001 | Angelella et al. | 219/69.12 |

FOREIGN PATENT DOCUMENTS

| | | |
|---|---|---|
| EP | 0 451 350 A2 | 12/1990 |
| JP | 55-134137 | 4/1979 |
| JP | 59-152021 | 8/1984 |
| JP | 08-300225 | 11/1996 |
| JP | 01-281822 | 4/2000 |
| JP | 2000-107945 | 4/2000 |

OTHER PUBLICATIONS

First Examination Report, dated Apr. 1, 2005, related to Chinese Application No. 031498981.
Notice of Reasons for Rejection.

* cited by examiner

*Primary Examiner*—Jayprakash N. Gandhi
(74) *Attorney, Agent, or Firm*—Staas & Halsey LLP

(57) ABSTRACT

Supply of a wire electrode, application of a detection voltage, and binarization and sampling of the detection voltage are started, so as to start advance of the wire electrode from the position A toward a workpiece. The position of the wire electrode when a sampling value (low level) is detected for the first time is designated as a position B, and the wire electrode is advanced from this position by a predetermined distance P1, and is stopped at a position C. Retreat of the wire electrode is started from the position C, and a position Q where the sampling value has changed from the high level to the low level is stored as a contact/noncontact boundary position. Further, retreat of the wire electrode is continued, and the wire electrode is stopped at a predetermined separating position D, to thereby finish the processing.

6 Claims, 4 Drawing Sheets

WIRE CONTACT/NONCONTACT BOUNDARY POSITION DETECTING APPARATUS OF WIRE CUT DISCHARGE MACHINE

BACKGROUND OF THE INVENTION

1. Field of the Invention

The present invention relates to detection of a relative position of a wire electrode with respect to an electroconductive object, representing a boundary between a contact state and a noncontact state between the wire electrode and the electroconductive object (workpiece, jig or the like), in a wire cut discharge machine. The relative position of the wire electrode can be used for determining a reference position for machining.

2. Description of the Prior Art

In machining by the wire cut discharge machine, a machining reference position for obtaining the relative position of the wire electrode with respect to the workpiece (or a detection jig for positioning used instead of the workpiece) is set. For this purpose, the wire electrode is relatively moved with respect to the workpiece so as to bring the workpiece into contact with the workpiece, and the relative position (contact position) of the wire electrode with respect to the workpiece at the time of contact is determined, and the machining reference position is generally determined based on the contact position.

For the machining reference position, the contact position between the wire electrode and the workpiece may be directly used, or another position having particular relation with the contact position may be used. For example, the wire electrode is made to pass through a round-hole formed corresponding to the machining start portion of the workpiece, three points are determined as a contact positions between the inner wall of the round-hole and the wire electrode by the relative movement in three directions, and the central position of a circular arc passing through these three points may be adopted as a machining reference position.

In order to accurately determine the machining reference position, the contact position between the wire electrode and the workpiece must be determined accurately. Generally, the detection of the contact position is performed by applying a detection voltage to between the wire electrode and the workpiece, and detecting a difference or transition of the detection voltage corresponding to the contact or noncontact state. In actually determining the contact position as described below, however, since a gray zone indicating an intermediate state (unstable state) between contact and noncontact states occurs, it is difficult to determine the contact position with good reproducibility.

In order to determine the contact position between the wire electrode and the workpiece, at first, the wire electrode is placed at a position reliably away from the workpiece (in the noncontact state), and the wire electrode is relatively moved toward the workpiece, with a contact detection voltage applied to between these from the position. By detecting that the wire electrode has been shifted from the noncontact state to the contact state with respect to the workpiece, from the transition of the voltage value for detecting the contact, the relative position of the wire electrode with respect to the workpiece at the time of detection is determined as a "contact position". The shift of the wire electrode from the noncontact state to the contact state is judged herein by detecting the fact that the detection voltage applied to between the wire electrode and the workpiece changes from a value corresponding to the noncontact state to a value corresponding to the contact state.

However, the change of the detection voltage at the time when the wire electrode shifts from the noncontact state to the contact state is unstable and the reproducibility is poor. It is considered that this is mainly attributable to the fact that when the wire electrode shifts from the noncontact state to the contact state, the wire electrode undergoes an unstable state accompanied with vibration. Since the wire electrode is continuously supplied at a considerably high feed rate so that the contact portion between the wire electrode and the workpiece is renewed at all times, in order to reduce the influence of mechanical and electrical damages on the wire electrode, which occur at the time of detecting the contact, vibration occurs inevitably in the wire electrode. Such vibration of the wire electrode make unstable the contact state between the wire electrode and the workpiece.

Further, the detection voltage may not clearly show a change, even if the wire electrode and the workpiece mechanically contact with each other, because an insulating film due to fats and oils or electrolysis exists on the surface of the wire electrode and the workpiece, and the contact pressure of the wire electrode against the workpiece is small even when the wire electrode completely comes in contact with the workpiece.

The observation of the transition of the detection voltage in the process in which the wire electrode relatively moves toward the workpiece from a position away from the workpiece schematically shows the followings. When the wire electrode relatively moves toward the workpiece from a state completely away from the workpiece, and the contact with the workpiece begins unstably, an initial drop in the detection voltage is observed. It is considered that this initial drop in the detection voltage corresponds to the start of contact of the wire electrode with respect to the workpiece. For a while thereafter, the detection voltage fluctuates frequently. Then, no change is observed with the detection voltage remaining low. It is considered that this state in which there is no change with the detection voltage being low expresses the complete contact state.

As described above, the existence of the unstable condition between contact and noncontact states, between the state in which the wire electrode is completely away from the workpiece, and the state in which the wire electrode completely comes in contact with the workpiece, makes it difficult to clearly specify the above contact position, that is, the relative position of the wire electrode at a point in time when the wire electrode shifts from the noncontact state to the contact state with respect to the workpiece. Therefore, when a process for making the wire electrode relatively approach and come in contact with the workpiece is executed for a plurality of times, while applying and monitoring the detection voltage, various transition of the detection voltages, which differ for each time, are observed, and hence the contact position cannot be obtained with high reliability. In other words, it is difficult with the conventional method to obtain with good reproducibility the relative position of the wire electrode with respect to the workpiece, corresponding to the boundary between the contact state and the noncontact state of the wire electrode and the workpiece.

On the other hand, for example, there is a method of using the statistical technique in which the contact position detection operation is repeated to average the obtained contact position detection values. However, this method does not essentially solve the above problem, and if it is tried to increase the precision, while ensuring the sufficient reproducibility at the detection position, it is necessary to increase the number of repetitions of the detection operation, thereby decreasing the efficiency.

OBJECT AND SUMMARY OF THE INVENTION

It is an object of the present invention, solving the problem in the prior art described above in the wire cut discharge machine, to provide a wire contact/noncontact boundary position detecting apparatus that can detect the relative position (hereinafter referred to as "wire contact/noncontact boundary position") of a wire representing the boundary between the contact state and the noncontact state of a wire electrode and an object (a workpiece or a position detection jig instead of the workpiece), with high reliability and good reproducibility.

The present invention solves the above problem by using the wire contact/noncontact boundary position detecting apparatus that can detect the contact and noncontact boundary position between the wire electrode and the object in the wire cut discharge machine with good reproducibility.

According to the present invention, the wire contact/noncontact boundary position detecting apparatus comprises: voltage application means for applying a detection voltage to between the wire electrode and the object; relative shift means for relatively shifting the wire electrode with respect to the object; control means for controlling a relatively approaching movement and a relatively separating movement of the wire electrode with respect to the object by the relatively shift means; and contact judgment means for judging the state relating to the contact or noncontact of the wire electrode and the object based on the detection voltage, in the process of the relatively approaching movement and the relatively separating movement.

The control means controls the relative shift means such that the relatively separating movement is executed after the relatively approaching movement has been executed until the wire electrode and the object completely come in contact with each other, and the contact judgment means judges that, in the process of the relatively separating movement, the wire electrode has come out of the complete contact state with the object, according to a first standard relating to the transition of the detection voltage, and designates the relative position of the wire electrode, at a point in time when disengagement thereof from the complete contact state begins, as a wire contact/noncontact boundary position.

Here, the wire contact/noncontact boundary position detecting apparatus may be constructed such that the contact judgment means judges that a contact of the wire electrode with the object begins in the process of the relatively approaching movement, based on a second standard relating to the transition of the detection voltage, and the control means controls the relative shift means such that the relatively approaching movement is executed for a predetermined distance from the relative position where the contact begins.

The wire contact/noncontact boundary position detecting apparatus may be constructed such that the contact judgment means judges that the wire electrode has completely come in contact with the object, in the process of the relatively approaching movement, based on a third standard relating to the transition of the detection voltage, and the control means controls the relative shift means so as to finish the relatively approaching movement based on the judgment according to the third standard, and start the relatively separating movement. The object is typically a workpiece, but may be a positioning jig instead of the workpiece.

As described above, in the present invention, at first, the wire electrode is made to relatively approach the object from a position away from the object to a state in which the wire electrode and the object completely come in contact with each other. In the complete contact state thereof, vibration of the wire electrode nearly stops, the possibility that a new insulating film is generated between these is very small, and even if the insulating film is generated, it is immediately removed by the friction between these. Therefore, the contact state becomes extremely stable.

Moreover, in order to ensure that the complete contact state can be achieved, it is only necessary to detect the start of the contact state based on an appropriate standard (the second standard; for example, initial drop of the detection voltage to a certain standard or below), and add the approaching movement by a predetermined distance from the start position of the contact state. Such "predetermined distance" can be determined by the design, taking into consideration a fluctuation in start positions of the contact state.

Alternatively, the judgment whether the complete contact state has been achieved or not may be performed according to an appropriate standard, for example, according to the third standard which determines whether or not a state in which the detection voltage becomes a certain standard or below continues for a predetermined period of time. Such "predetermined period of time" can be set, taking into consideration the approaching speed of the wire electrode toward the object and vibration amplitude of the wire electrode.

Subsequently, in the process of relatively moving the wire electrode in a direction away from the object, disengagement from the complete contact state is detected. As a result of this, the relative position of the wire electrode where disengagement has occurred is detected, and the detected relative position is considered to be a position representing the boundary between the contact and noncontact states of the wire electrode and the object. Disengagement from the complete contact state is judged according to the first standard relating to the transition of the detection voltage. Here, as "the first standard", for example, "whether or not the detection voltage has risen to a predetermined level or higher from a low level representing the complete contact state" can be adopted.

It should be noted here that "disengagement from the complete contact state" in the separating process after the wire electrode and the object has shifted from the complete noncontact state to the complete contact state occurs more stably as compared with the state transition in the approaching process described above (which is detected, for example, by the drop of the detection voltage to the certain level or below), so that the reproducibility of the position is good.

Therefore, according to the present invention, it is not necessary to apply the statistical technique, such as repeating contact position detection many times to average the detected values, and a position representing the boundary between the contact state and the noncontact state can be determined with less number of repetition (according to circumstances, only once).

BRIEF DESCRIPTION OF THE DRAWINGS

The above-described objects, other objects and the feature of the present invention will become obvious from the description below relating to the embodiment with reference to the accompanying drawings, wherein.

DETAILED DESCRIPTION OF THE PREFERRED EMBODIMENTS

Figure 1:
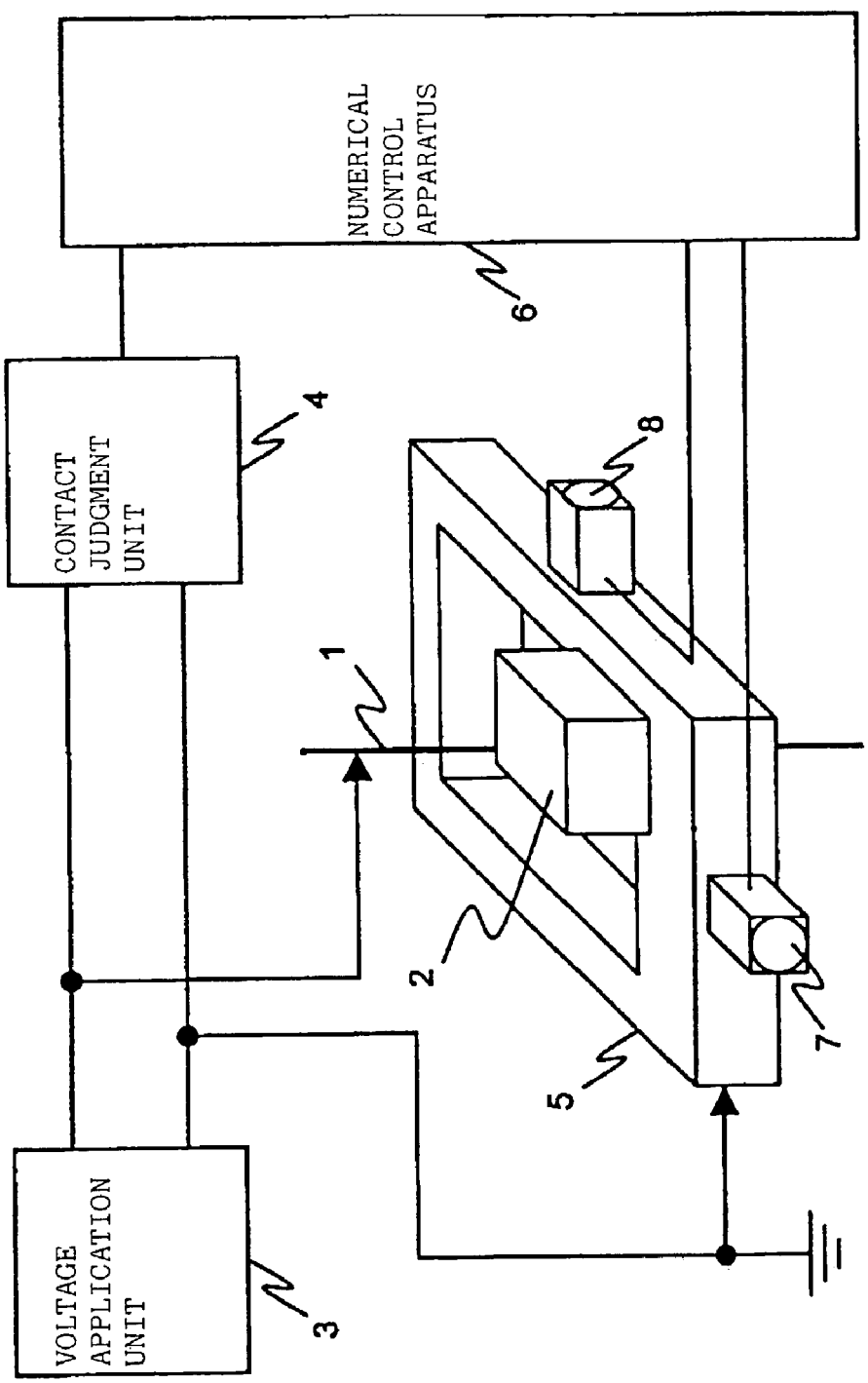
FIG. 1 is a diagram showing the overall configuration of a wire cut discharge machine comprising the wire contact/noncontact boundary position detecting apparatus according to the present invention.

The embodiment of the present invention will now be described, with reference to FIG. 1 to FIG. 4. FIG. 1 shows the overall configuration of a system for detecting the wire contact/noncontact boundary position according to the present invention. This system includes a wire contact/noncontact boundary position detecting apparatus and a wire cut discharge machine using the wire electrode of which position is detected by the wire contact/noncontact boundary position detecting apparatus.

In FIG. 1, an XY table 5 is a worktable whose position is controlled two-dimensionally by two axes (X axis and Y axis). An object 2 is placed on this XY table 5. The object 2 is a workpiece or a positioning jig instead of the workpiece, and hereunder, this object is described as a "workpiece" representatively. A detection voltage or a machining voltage can be applied by a voltage application unit 3 to between a wire electrode 1 used for machining and the XY table 5.

The detection voltage is a voltage (which does not cause discharge) applied for detecting the contact or noncontact state between the wire electrode 1 and the workpiece 2. When the wire electrode 1 comes in contact with the workpiece 2, conduction occurs, and the actually applied voltage fluctuates. A contact judgment unit 4 judges the contact state in a mode described later, by monitoring the voltage fluctuation.

On the other hand, the machining voltage is a high voltage applied at the time of performing actual machining on the workpiece 2. Electric discharge machining is applied to the workpiece 2, by shifting the XY table 5 in the right and left direction in the figure (hereinafter referred to as ±X direction) and a depth direction orthogonal to the ±X direction (hereinafter referred to as ±Y direction), while applying the machining voltage according to the machining program or the like.

Servomotors 7 and 8 are used for shifting the XY table in the ±X direction and in the ±X direction. These servomotors 7 and 8 are controlled by a numerical control apparatus 6. To perform machining according to a machining program, the numerical control apparatus 6 reads the machining program to control the servomotors 7 and 8 and the voltage application unit 3 so that machining instructed by the machining program is performed.

Though not shown, the system in FIG. 1 comprises a CPU for controlling the whole system, a programmable controller, a memory such as a ROM, a RAM and a nonvolatile RAM for storing data for the machining program and data such as various parameters, a control panel including a manual operation section, and an interface arranged between necessary elements, according to need.

When executing the wire cut discharge machining, it is generally necessary to determine a machining reference position. Such a machining reference position is a position to be a reference for knowing the relative position of the wire electrode 1 with respect to the workpiece 2 during machining, and if this machining reference position is incorrect, a deviation occurs inevitably in the machining position (or a machining line). If the workpiece 2 is positioned on the XY table 5, the relative position of the wire electrode 1 with respect to the workpiece 2 is determined by the relative position of the wire electrode 1 with respect to XY table 5.

Therefore, the relative position of the wire electrode 1 with respect to the XY table 5 is expressed by a driving position (x, y) of the XY table 5 by the servomotors 7 and 8. When the wire electrode 1 is in the machining reference position, the machining reference position is expressed by (x0, y0). In order to actually determine the machining reference position, a known relative position (xq, yq) of the wire electrode 1 under a specific situation is used. In this case, this specific relative position (xq, yq) may be designated as a machining reference position (x0, y0), that is, (x0, y0)=(xq, yq), or the machining reference position (x0, y0) may be determined from a plurality of known specific relative positions (xq1, yq1), (xq2, yq2), (xq3, yq3), . . . Therefore, in order to accurately determine the machining reference position (x0, y0), the specific relative position (xq, yq) of the wire electrode 1 must be determined first.

In the present invention, the specific relative position (xq, yq) of the wire electrode 1 is determined in the following manner. At first, the wire electrode 1 is relatively moved toward the workpiece 2, to thereby bring the wire electrode 1 into complete contact with the workpiece 2. The wire electrode 1 is then relatively moved away from the workpiece 2, and in this process, the relative position of the wire electrode 1 when the judgment by the detection voltage changes from contact to noncontact is set to be a specific relative position (xq, yq) of the wire electrode 1.

In other words, when determining the machining reference position, in the conventional method, the wire electrode 1 is relatively moved toward the workpiece 2, to determine the relative position (xq, yq) of the wire electrode 1 at a point in time when the wire electrode 1 changes from the noncontact state to the contact state. On the other hand, in the present invention, the wire electrode 1 is relatively moved away from the workpiece 2, to determine the relative position (xq, yq) of the wire electrode 1 at a point in time when the wire electrode 1 changes from the contact state to the noncontact state.

Therefore, the specific relative position (xq, yq) of the wire electrode 1 determined according to the present invention is referred to hereunder as "contact/noncontact boundary position", to thereby discriminate it from the "contact position", being the relative position (xq, yq) of the wire electrode 1 determined according to the prior art.

The relative movement of the wire electrode 1 toward the workpiece 2 or in a direction away from the workpiece 2 is actually realized by shifting the XY table 5 with respect to the wire electrode 1 locating at a fixed position by the operation of the servomotors 7 and 8.

Figure 2:
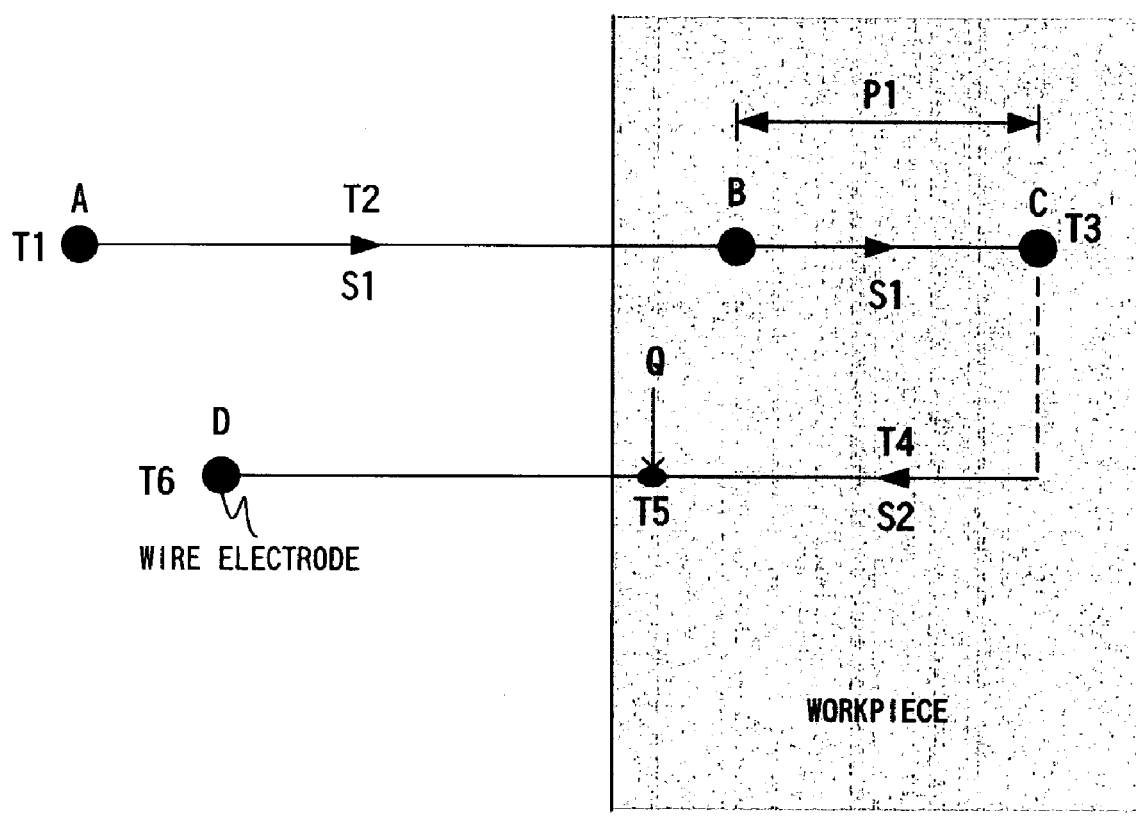
FIG. 2 is a diagram expressing the transition in the relative position of the wire electrode with respect to the workpiece, when the contact/noncontact boundary position is detected by using the apparatus shown in FIG. 1.

FIG. 2 represents the transition of the relative position of the wire electrode 1 with respect to the workpiece 2, when detecting the contact/noncontact boundary position in the present embodiment. At first, the servomotors 7 and 8 are operated by a manual operation, using a contact/noncontact boundary position operation panel (not shown in FIG. 1), to position the wire electrode 1 at a position away from the workpiece 2 by a suitable small distance (at an initial position A).

Figure 3:
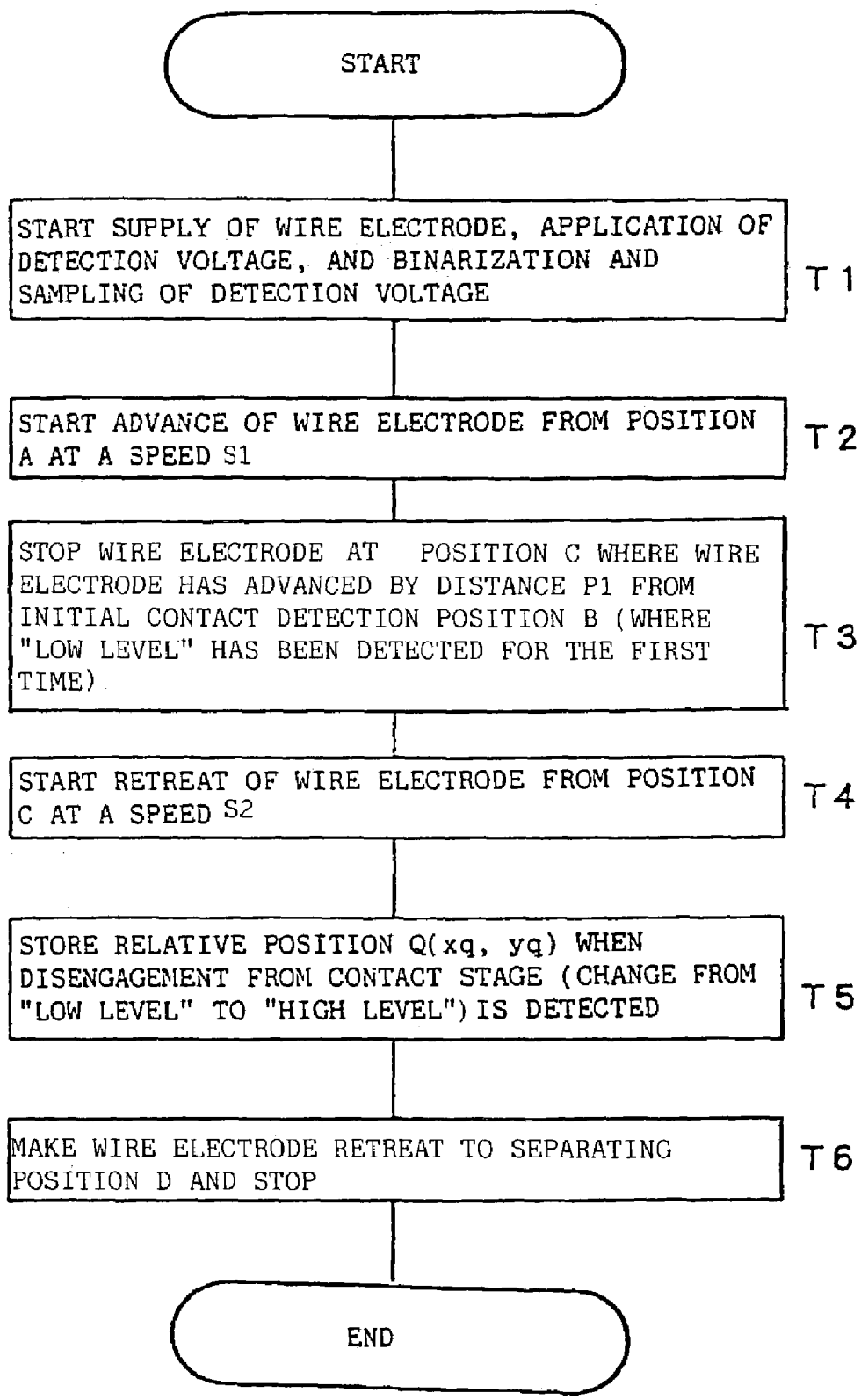
FIG. 3 is a flowchart for explaining the processing procedure shown in FIG. 2, when the contact/noncontact boundary position is detected.
Figure 4:
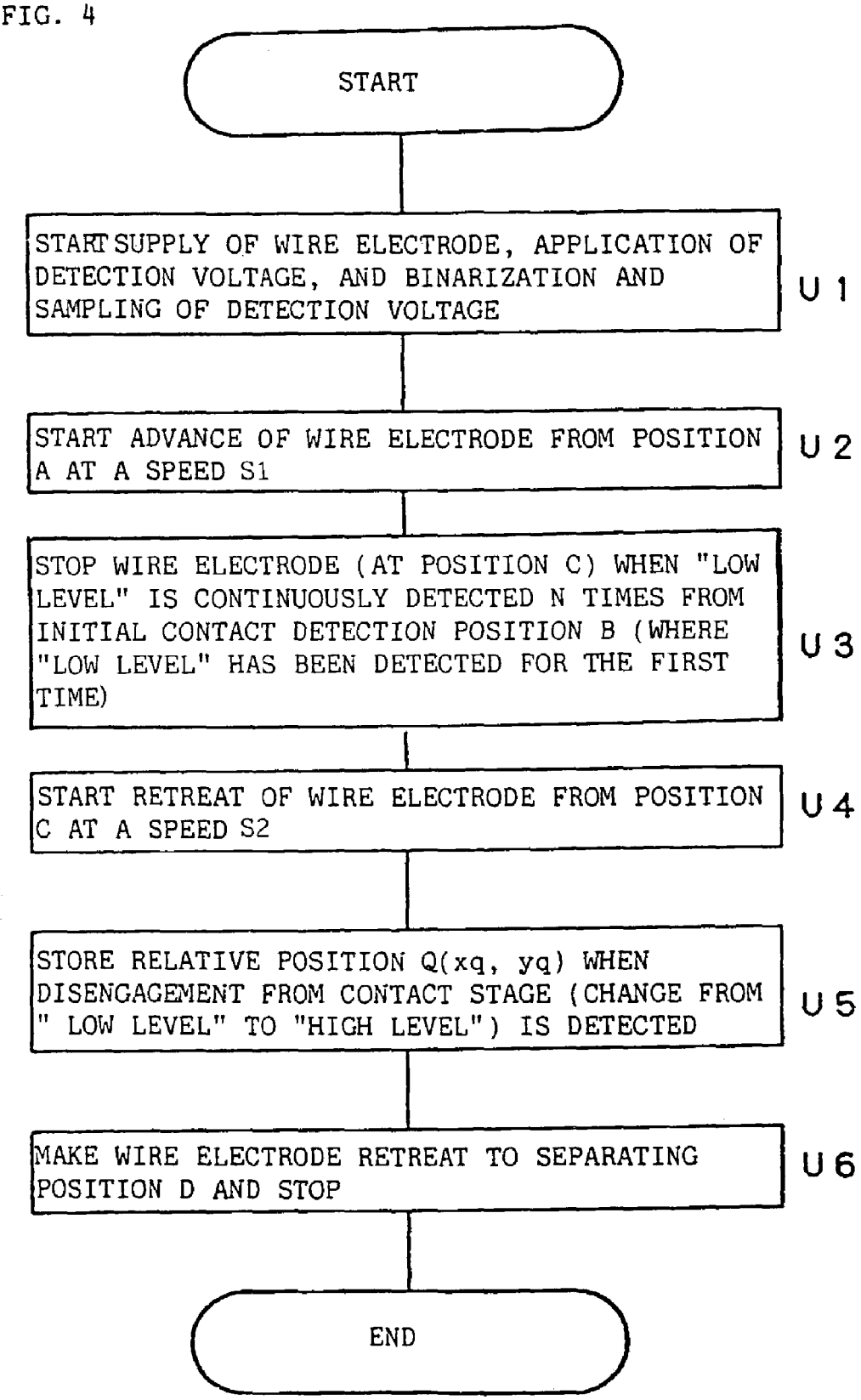
FIG. 4 is a flowchart for explaining another example other than the processing procedure shown in FIG. 3.

The procedure after positioning of the wire electrode 1 at the initial position A is performed by software processing. The program and data such as parameters necessary for the processing are stored in advance, for example, in a nonvolatile memory (not shown in FIG. 1) equipped in the system. FIG. 3 is a flowchart showing an outline of the processing procedure. The main point in each step is as described below.

Step T1; Start supply of the wire electrode 1, application of the detection voltage by the voltage application unit 3, and monitoring of the detection voltage by the contact judgment unit 4. Monitoring of the detection voltage is carried out by binarizing the detected applied voltage value to "1" expressing a high level and "0" expressing a low level, by the comparison thereof with a predetermined threshold, and sampling the binarized voltage values in a predetermined cycle.

Step T2; While continuing binarization and sampling of the detection voltage, start the relative movement (advance) of the wire electrode 1 from the initial position A toward the workpiece 2. The direction of the relative movement of the wire electrode 1 is set to be a direction substantially orthogonal to the contact face of the workpiece 2. For example, if the workpiece 2 is positioned such that the contact face (a face of the workpiece 2 used for the detection of the contact/noncontact boundary position) becomes parallel with the Y direction, it is assumed that the movement of the wire electrode 1 is in the X direction (+X direction or −X direction). After initiating the approaching movement from the initial position A, "1" (high level) is obtained as a sampling value for each predetermined sampling cycle, for a while.

Step T3; Designate the position of the wire electrode 1 when it is detected that the sampling value has changed from "1" (high level) to "0" (low level) for the first time since having departed from the initial position A, as a contact starting position B. This contact starting position B is understood as a position where the wire electrode 1 first comes in contact with the workpiece 2, though such a position is unstable. The judgment standard for detecting such contact starting position B is referred to as a "second judgment standard" in the above description. The wire electrode 1 is moved by a predetermined distance P1 in the same direction from the contact starting position B, and stopped at a stopping position C.

The distance P1 between the contact starting position B and the stopping position C is predetermined in a value which ensures that the wire electrode 1 is appropriately pressed to the workpiece 2 at the stopping position C to completely come in contact with the workpiece 2. As described above, the contact starting position B may fluctuate over a significant range for each measurement, due to the influence of vibration of the wire electrode 1, formation of an insulating film, or the like. Therefore, the distance P1 is set, taking the fluctuating in the contact starting position B into consideration. Normally, the value of the distance P1 is an order of several millimeters.

After the wire electrode 1 has stopped at the stopping position C, binarization and sampling of the detection voltage is continued.

Step T4; Start the relative movement (retreat) of the wire electrode 1 from the stopping position C to go away from the workpiece 2, while continuing binarization and sampling of the detection voltage. The moving direction of the wire electrode 1 at the time of retreat is assumed to be a direction opposite to the moving direction at the time of advance (a direction inverted by 180 degrees). After having started retreat, "0" (low level) is obtained as a sampling value for each predetermined sampling cycle, for a while.

Step T5; Designate the position where the sampling value "1" (high level) is detected for the first time since having started the retreat from the stopping position C as a contact/noncontact boundary position Q, and store the position data (xq, yq) thereof in the memory. The judgment standard for detecting the contact/noncontact boundary position Q is referred to as a "first judgment standard" in the above description.

Step T6; Continue the retreat of the wire electrode 1 further, and stop the wire electrode 1 at a predetermined separating position D, thereby finish the processing.

By executing the steps T1 to T6 for one cycle, data for one contact/noncontact boundary position Q (xq, yq) is obtained. By repeating this execution cycle for a plurality of times, and averaging the data of the respectively obtained contact/noncontact boundary positions, the contact/noncontact boundary position Q can be determined with higher reliability.

In FIG. 2, the contact/noncontact boundary position Q is shown on the side of the initial position A (rather than on the side of the stopping position C) with respect to the contact starting position B, but this does not mean to deny an opposite case, because such contact starting position B may fluctuate considerably, as described above.

In the processing procedure described above, the procedure may be changed such that the stopping position C where complete contact between the wire electrode 1 and the workpiece 2 is ensured is determined by a method different from the method explained with reference to the flowchart shown in FIG. 3. One modified example of such processing procedure is described below, with reference to the flowchart shown in FIG. 4. The main point in each step is as described below.

Step U1; Start supply of the wire electrode 1, application of the detection voltage by the voltage application unit 3, and monitoring of the detection voltage by the contact judgment unit 4. Monitoring of the detection voltage is carried out by binarizing the detected applied voltage value to "1" expressing a high level and "0" expressing a low level, by the comparison thereof with a predetermined threshold, and sampling the binarized voltage values in a predetermined cycle.

Step U2; Start the advance of the wire electrode 1 from the initial position A toward the workpiece 2, while continuing binarization and sampling of the detection voltage. It is assumed that the moving direction at the time of advance is a direction substantially orthogonal to the contact face of the workpiece 2.

Step U3; Designate the position of the wire electrode 1 when it is detected that the sampling value has changed from "1" (high level) to "0" (low level) for the first time since having departed from the initial position A, as a contact starting position B.

The processing procedure until detecting the contact starting position B is the same as a processing procedure shown in FIG. 3.

After having detected the contact starting position B, the wire electrode 1 is advanced from the position B until "0" (low level) is detected N times continuously, and then stopped at the stopping position C. In the above description, the judgment standard for detecting such contact starting position C is referred to as a "third judgment standard". The value of N is predetermined such that the wire electrode 1 is appropriately pressed to the workpiece 2 at the contact starting position C to ensure the complete contact. The practical value of N is in general a considerably large number, though depending on the sampling cycle, and for example, N=100. After the wire electrode 1 has stopped at the stopping position C, binarization and sampling of the detection voltage is continued.

Step U4; Start retreat of the wire electrode 1 from the stopping position C, while continuing binarization and sampling of the detection voltage. The moving direction of the wire electrode 1 at the time of retreat is assumed to be a direction opposite to the moving direction at the time of advance (a direction inverted by 180 degrees). After having started the retreat, "0" (low level) is obtained as a sampling value for each predetermined sampling cycle, for a while.

Step U5; Designate the position where the sampling value "1" (high level) is detected for the first time since having started the retreat from the stopping position C as a contact/noncontact boundary position Q, and store the position data (xq, yq) thereof in the memory.

Step U6; Continue the retreat further, and stop the wire electrode 1 at a predetermined separating position D, thereby finish the processing.

By executing the steps U1 to U6 for one cycle, data for one contact/noncontact boundary position Q (xq, yq) is obtained, as in the same manner as in executing the steps T1 to T6. Needless to say, the number of cycles to be executed may be increased and the data of the obtained positions Q may be averaged, to improve the reliability.

As described above, the machining reference position can be determined based on the contact/noncontact boundary position. In the present invention, there is no particular limitation on the method of determining the machining reference position, but as an example, the following cases (1) to (3) can be considered:

(1) The contact/noncontact boundary position Q is directly used as a machining reference position;

(2) The contact/noncontact boundary position Q is shifted by a known amount, and used as a machining reference position. If the contact/noncontact boundary position Q is expressed as (xq, yq), a shift quantity in the X direction is expressed as $\Delta xq$, and a shift quantity in the Y direction is expressed as $\Delta yq$, the machining reference position becomes $(xq+\Delta xq, yq+\Delta yq)$.

(3) The position A (advance starting position; see FIG. 2) is set in the vicinity of the center of a round-hole formed in a machining starting portion of the workpiece 2, and while changing advance/retreat direction by 120 degrees, steps T1 to T6 or steps U1 to U6 are executed for one cycle each (in total three cycles). As a result, data (xq1, yq1), (xq2, yq2) and (xq3, yq3) at three different positions Q1, Q2 and Q3 can be obtained. The central position of a circular arc passing through these positions Q1, Q2 and Q3 is determined, and the central position is used as a machining reference position.

As described above, according to the present invention, in the wire cut discharge machine, the relative position of the wire electrode (wire contact/noncontact boundary position) representing the boundary between the contact state and the noncontact state of the wire electrode and the object (a workpiece or a position detection jig instead of the workpiece) can be detected, with high reliability and good reproducibility. Further, the machining reference point can be determined based on the highly reliable wire contact/noncontact boundary position.

The invention claimed is:

1. A wire contact/noncontact boundary position detecting apparatus for detecting a contact/noncontact boundary position of a wire electrode and a conductive object in a wire cut discharge machine, comprising:

voltage application means for applying a detection voltage to between the wire electrode and the object;

relative shift means for relatively shifting the wire electrode with respect to the object;

control means for controlling a relatively approaching movement and a relatively separating movement of the wire electrode with respect to the object by the relative shift means; and contact judgment means for judging the state relating to the contact and noncontact of the wire electrode and the object based on the detection voltage, in the process of the relatively approaching movement and the relatively separating movement, wherein the control means controls the relative shift means such that the relatively separating movement is executed after the relatively approaching movement has been executed until the wire electrode and the object completely come in contact with each other, and the contact judgment means judges that, in the process of the relatively separating movement, the wire electrode has come out of the complete contact state with the object, according to a first standard relating to the transition of the detection voltage, and the relative position of the wire electrode, at a point in time when disengagement thereof from the complete contact state begins, is designated as a wire contact/noncontact boundary position.

2. The wire contact/noncontact boundary position detecting apparatus according to claim 1, wherein the contact judgment means judges that a contact of the wire electrode with the object begins in the process of the relatively approaching movement, based on a second standard relating to the transition of the detection voltage, and the control means controls the relative shift means such that the relatively approaching movement is executed for a predetermined distance from the relative position where the contact begins.

3. The wire contact/noncontact boundary position detecting apparatus according to claim 1, wherein the contact judgment means judges that the wire electrode has completely come in contact with the object, in the process of the relatively approaching movement, based on a third standard relating to the transition of the detection voltage, and the control means controls the relative shift means so as to finish the relatively approaching movement based on the judgment according to the third standard, and start the relatively separating movement.

4. The wire contact/noncontact boundary position detecting apparatus according to claim 1, wherein the object is a workpiece.

5. The wire contact/noncontact boundary position detecting apparatus according to claim 1, wherein the object is a positioning jig.

6. A method of detecting a contact/noncontact boundary position of a wire electrode and a conductive object in a wire cut discharge machine, comprising:

applying a detection voltage across the wire electrode and the conductive object;

shifting the wire electrode relative to the conductive object;

controlling a relative approaching movement and a relative separating movement of the wire electrode with respect to the conductive object; and judging the state relating to a contact and a noncontact of the wire electrode and the conductive object based on the applied detection voltage, in the process of the relative approaching movement and the relative separating movement.

* * * * *